United States Patent [19]

Bradshaw

[11] 4,371,016
[45] Feb. 1, 1983

[54] DELIMBING APPARATUS

[76] Inventor: Jack E. Bradshaw, Rte. 3, Box 184A, Wallace, N.C. 28466

[21] Appl. No.: 242,618

[22] Filed: Mar. 11, 1981

[51] Int. Cl.³ ............................................... B27L 1/00
[52] U.S. Cl. .................................. 144/2 Z; 144/208 R
[58] Field of Search .................... 144/2 Z, 208 R, 343

[56] References Cited

U.S. PATENT DOCUMENTS 3,805,858  4/1974  Morin .................................. 144/2 Z
4,172,478 10/1979  Dakus .................................. 144/2 Z Primary Examiner—W. D. Bray Attorney, Agent, or Firm—Shlesinger, Arkwright, Garvey & Dinsmore

[57] ABSTRACT

This invention pertains to a delimbing apparatus which is mounted on a vehicle and is constructed to delimb several felled trees as the vehicle moves the delimbing apparatus over the trees. The delimbing apparatus comprises a frame having a plurality of downwardly projecting delimbing arms which are rigidly secured in place by means of support braces welded to the frame and extending partially the length of the delimbing arms. The delimbing arms may additionally be provided with cutting blades to further facilitate the delimbing action.

12 Claims, 10 Drawing Figures

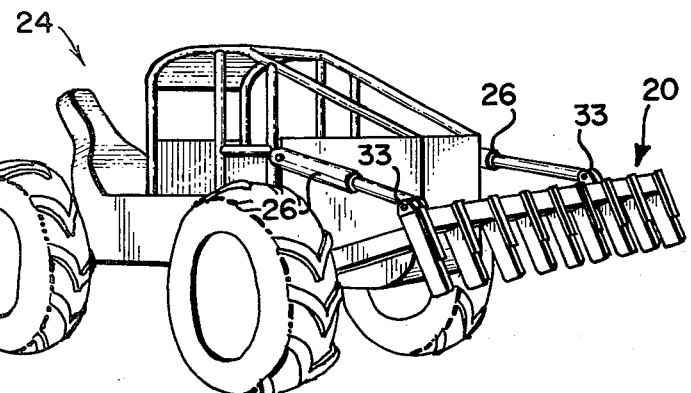
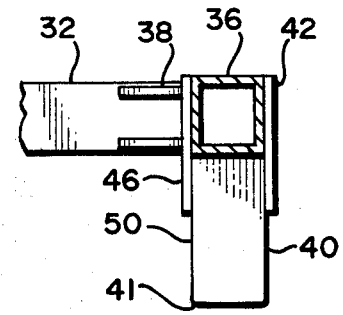
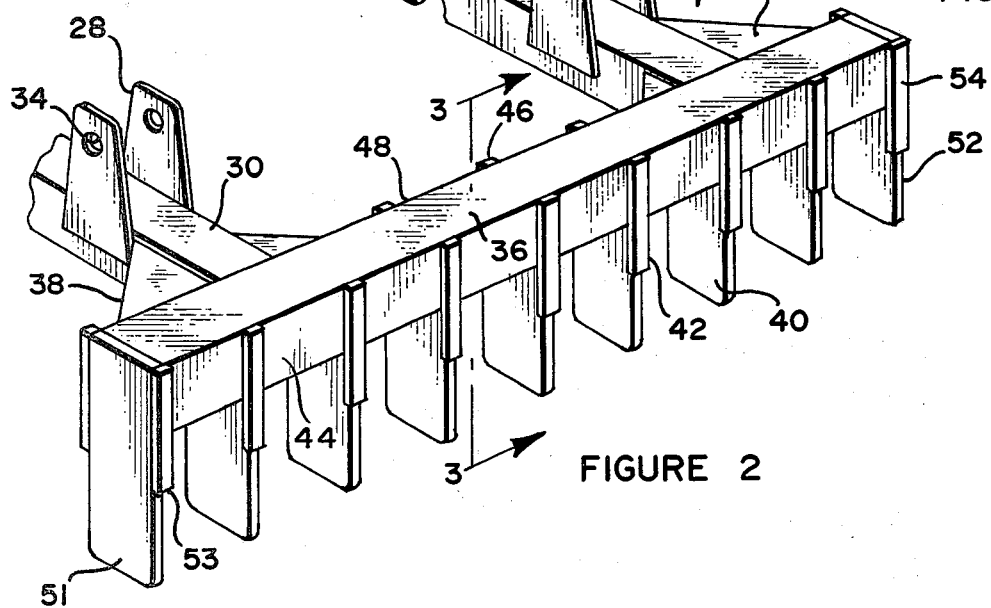
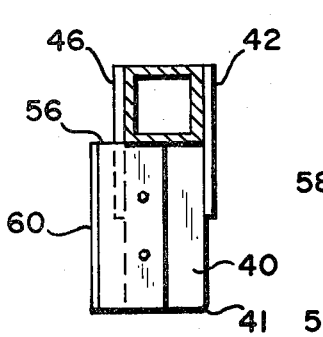
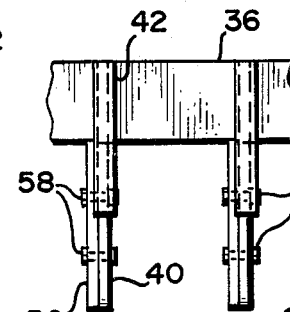
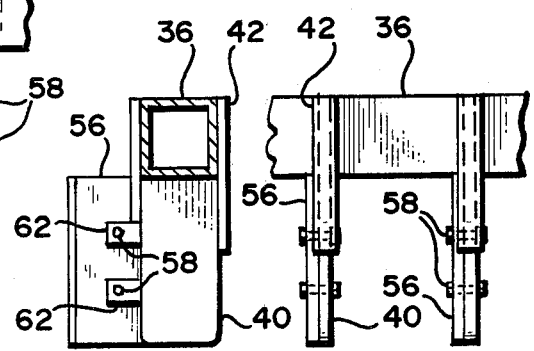

DELIMBING APPARATUS

BACKGROUND AND FIELD OF THE INVENTION

The present invention relates to delimbing apparatus for simultaneously delimbing a plurality of felled trees.

Logging operations most frequently require delimbing of felled trees in order to improve and simplify the handling and transportation of the cut trees. Many different types of delimbing apparatus are known in the logging art including machines which are designed to delimb individual trees with hand operated or machine assisted mechanisms. Logging operations most efficiently require the use of a delimbing apparatus which will simultaneously quickly and easily delimb a plurality of trees but few machines in the logging art provide such a delimbing apparatus.

OBJECTS AND SUMMARY OF THE INVENTION

It is therefore one object of the present invention to provide a delimbing apparatus operable by a machine for simultaneously delimbing a plurality of felled trees lying generally parallel on the ground.

It is another object of the present invention to provide a delimbing apparatus including a plurality of delimbing arms for quickly and efficiently stripping branches from a plurality of felled trees.

It is a further object of the present invention to provide a delimbing apparatus having a plurality of delimbing arms which are securedly affixed to a frame member whereby the delimbing apparatus has a long machine life and is not subject to breakdown of the delimbing arms.

It is a still further object of the present invention to provide a delimbing apparatus wherein the delimbing arms may be provided with cutting blades for facilitating the stripping of branches from felled trees.

It is still another object of the present invention to provide a delimbing apparatus having delimbing arms which are provided with cutting edges that are quickly and easily removable for sharpening purposes.

These and other objects of the present invention are accomplished by a delimbing apparatus which is mounted on a vehicle for delimbing several felled trees as the vehicle and mounted delimber pass over the trees. The delimbing apparatus is comprised of a frame having a plurality of downwardly projecting delimbing arms which are rigidly secured in place by means of support braces welded to the frame and extending partially the length of the delimbing arms. The delimbing arms may additionally be provided with removable cutting blades to further facilitate the delimbing action.

DESCRIPTION OF THE DRAWINGS

In the accompanying drawings which illustrate by way of example various embodiments of this invention:

FIG. 1 is a perspective view of a vehicle having one embodiment of the delimbing apparatus attached thereto.

FIG. 2 is a fragmentary perspective view, portions broken away, of the delimbing apparatus including mounting arms for attaching to a vehicle.

FIG. 3 is a fragmentary cross sectional view of the delimbing apparatus taken along lines 3—3 of FIG. 2 and seen in the direction of the arrows.

FIG. 4 is a cross sectional view of an alternative form of the delimbing apparatus having a cutting blade attached to the rear of the delimbing arm.

FIG. 5 is a fragmentary front elevational view of a portion of the delimbing apparatus of the alternative embodiment shown in FIG. 4 having a cutting blade attached to the delimbing arm.

FIG. 6 is a cross sectional view similar to FIG. 4 of a delimbing arm showing another alternative method of attaching a cutting blade.

FIG. 7 is a front elevational view of a delimbing arm of the other alternative embodiment shown in FIG. 6 having a cutting blade attached.

FIGS. 1 THROUGH 10

FIG. 1 shows the delimbing apparatus 20 attached to a vehicle 24 of the type frequently used in logging operations equipped with a conventional hydraulic cylinder 26 for movement of a scoop or other apparatus attached to the front of the vehicle 24. In this case, the hydraulic cylinders 26 are directly attached to the delimbing apparatus 20 by means of flanges 28 projecting from support arms 30 and 32. Delimbing apparatus 20 is attached to hydraulic cylinders 26 with bolts 33 or other similar attaching devices passing through holes 34 in flanges 28. Support arms 30 and 32 are provided with connecting hooks 35 or similar device for attachment to eyes (not shown) on the tractor frame, as best shown in FIG. 1, for pivoting action.

Figure 8:
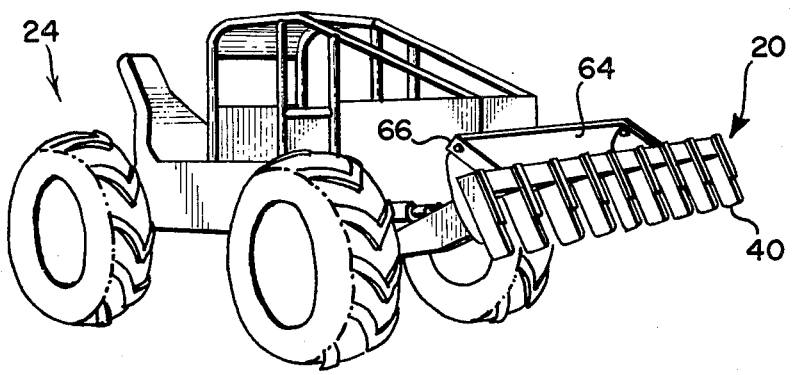
FIG. 8 is a perspective view of an alternative form of the delimbing apparatus being attached to a pivotal boom of a vehicle.

The delimbing apparatus 20 is comprised of a frame 36 which is generally rectangular in cross section and constructed of heavy metal. The frame 36 is welded to support arms 30 and 32 and further restrained from movement with respect to the support arms by means of braces 38 which are generally triangular in shape and extend between support arms 32 and 34 and the frame 36. Delimbing arms 40 project generally perpendicular downward from the frame 36 and are welded flush with the bottom of frame 36 as shown to advantage in FIG. 3. Delimbing arms 40 are preferably constructed of desired lengths of six inch by one and one half inch flat metal and have been found to be most efficient when used in fifteen inch lengths. Delimbing arms 40, as shown to advantage in FIGS. 3, 4 and 6, are further constructed with rounded bottom corners 41 to reduce the possibility of the arms 40 from digging and lodging into the ground as so often happens with square cornered delimbing arms.

To further insure the rigid attachment of delimbing arms 40 to the frame 36, support braces 42 are provided on the front face 44 of frame 36 and support braces 46 are provided on the back face 48 of frame 36. Both support braces 42 and 46 are welded to the frame 36 and delimbing arms 40 and extend from the top of frame 36 downwardly a portion of the length of the delimbing arms 40. The support braces 46 on the back face 48 are constructed of one inch by one inch flat metal bars thereby having a width less than the thickness of delimbing arms 40. Such a construction ensures that support braces 46 do not conceal or interfere with the back edge 50 of the delimbing arms 40 which will perform the delimbing action on the limbs of a tree. The back edge 50 of the delimbing arms 40 will perform the delimbing action as the delimbing arms 40 are passed long the length of a tree trunk. During this delimbing procedure, back edge 50 will periodically be engaged between a limb and the tree trunk and, when moved by the force of vehicle 24, will break the branch at its junction with the tree trunk.

To additionally protect against undesired movement and and to protect against breakage of the delimbing arms 40 during a delimbing operation, support braces 42 on the front face of frame 36 are preferably constructed of two inch by one inch flat bars providing a slight overhang of the support braces 42 on either side of the delimbing arms 40 as shown to advantage in FIGS. 5 and 7. It is further noted that the delimbing arms 51 and 52 on the two ends of frame 36 are secured flush and squared against the end of the frame 36. The two end support braces 53 and 54 are attached in a manner similar to the other support braces 42 but are shifted inward with respect to frame 36 so that the outside edges of end support braces 53 and 54 are flush against the face of the end delimbing arms 51 and 52 and not projecting outward from the ends of the delimbing apparatus.

CUTTING BLADES

To further facilitate the delimbing apparatus, the delimbing arms 40 may be provided with a cutting blade 56 as shown to advantage in FIGS. 4 and 5. Cutting blades 56 will be provided on each of the delimbing arms attached by means of bolts 58 or similar securing means projecting through blades 56 and delimbing arms 40 with the cutting surfaces 60 projecting from the back face 48 of frame 36 and pointing towards the vehicle 24. Alternatively, cutting blades 56 may be secured to the delimbing arms 40 by means of attaching strips or support brackets 62 which are welded to the delimbing arms 48 and extend to blades 56 where they are attached by means of bolts 58 or the like as shown to advantage in FIGS. 6 and 7. Whether secured directly by bolts 58 or attached by means of securing strips 62, it is important to note that blades 56 are easily removed from delimbing arms 40. Continuous use in delimbing operations gradually dulls the cutting surfaces 60 but the present invention allows the operator to easily remove the blades 56 so they can be sharpened to maintain the delimbing apparatus 20 in peak operational condition.

ALTERNATIVE MOUNTINGS

Figure 9:
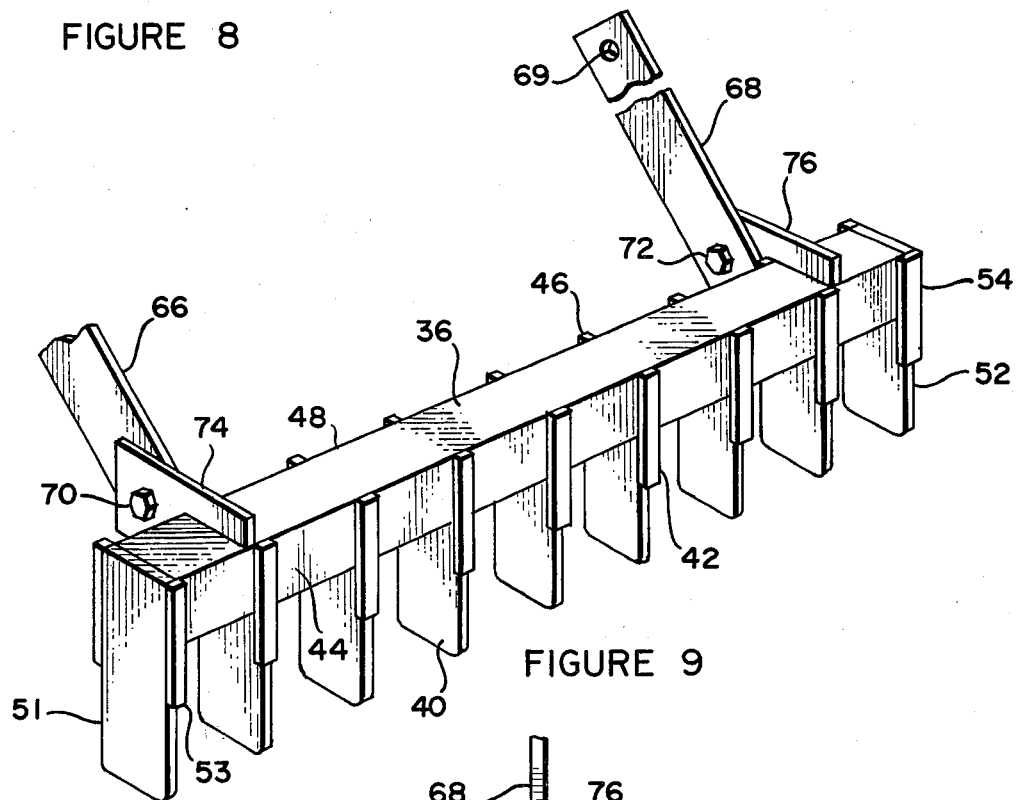
FIG. 9 is a perspective view of an alternative form of the delimbing apparatus, shown in FIG. 8.
Figure 10:
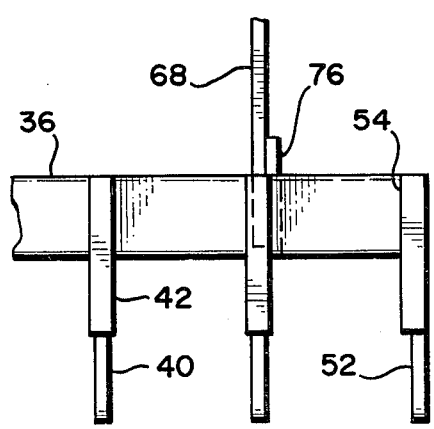
FIG. 10 is a fragmentary front elevational view of a portion of the alternative embodiment of the delimbing apparatus shown in FIG. 9.

Attachment of the delimbing apparatus 20 to a vehicle 24 may be accomplished by one of two methods. The first method and structure shown in FIGS. 1 and 2 does not require the vehicle 24 to be provided with a front scoop or blade 64 or the like since the delimbing apparatus 20 shown in FIG. 2 will directly attach to hydraulic cylinders 26 by means of braces 38. This construction permits the operator of vehicle 24 to pivotally align the delimbing apparatus 20 by actuating hydraulic cylinders 26. Alternatively, the delimbing apparatus 20 may be provided with an attachment structure as shown in FIGS. 8 and 9 whereby the delimber is attached to a vehicle 24 which is provided with a front scoop 64. To this end, delimbing apparatus 20 is placed up against the front of front scoop 64 with bracing arms 66 and 68 pointing toward the vehicle 24 and subsequently attached to the front scoop 64 by means of a bolt passing through hole 69 in bracing arms 66 and 68.

Bracing arms 66 and 68 are pivotally attached by bolts 70 and 72 to brackets 74 and 76 projecting from frame 36 so as to provide flexibility in the positioning of the delimbing apparatus 22 on the front scoop 64. The brackets 74 and 76 are securely welded to the frame 36 and project rearwardly therefrom for receiving bracing arms 66 and 68.

The delimbing apparatus 20 of the present invention is operated by first attaching the delimbing apparatus 20 directly to the hydraulic cylinders 26 for the structure shown in FIG. 2 described above or by attaching the delimbing apparatus 22 to a front scoop 64 of vehicle 24 for the structure shown in FIG. 9 described above. Once the delimbing apparatus 20 has been securely attached, the vehicle 24 is moved along a row of felled trees which are lined generally parallel to one another until the delimbing apparatus 20 is positioned at the top of the trees. Depending upon the type trees, whether hardwood or pine, either front or rear portions of the delimbing arms or tines 40 engage the tops of the trees and work toward the base of the trunks. With hardwood in general, the cutting blades 56 are used to help sever the branches. Starting then at the top of the felled trees, the operator of the vehicle 24 will lower the delimbing apparatus 20 to a point where the delimbing arms 40 are just above the ground and the arms 40 including or not including cutting blades 56 are positioned between each tree adjacent to the trunks of the trees. The vehicle 24 is then moved in a direction causing the delimbing arms 40 to be moved against the branches of the trees, thereby stripping the trees of their limbs as the delimbing arms 40 pass along the trunks of the trees.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A vehicle delimbing apparatus for delimbing trees including:
   (a) a frame having a top, a bottom, a front and a back;
   (b) a plurality of delimbing arms projecting from the bottom of said frame;
   (c) support braces secured to the front and back of said frame generally parallel to said delimbing arms extending partially along the length of said arms and being securedly affixed to said frame and said arms,
   (d) whereby said delimbing arms are restrained from movement when said delimbing apparatus is operated by being moved along the longitudinal length of felled trees; and,
   (e) attachment means for attaching said delimbing apparatus to a vehicle.

2. A vehicle delimbing apparatus for delimbing trees as in claim 1 and wherein:
   (a) said delimbing arms project substantially perpendicular from said frame.

3. A vehicle delimbing apparatus for delimbing trees as in claim 1 and wherein:

(a) said support braces are welded to said frame and said delimbing arms.

4. A vehicle delimbing apparatus for delimbing trees as in claim 1 and wherein:
   (a) a cutting blade is detachably securedly affixed to said delimbing arm having a cutting edge substantially parallel to said delimbing arms.

5. A vehicle delimbing apparatus for delimbing trees as in claim 1 and wherein:
   (a) said delimbing arms have a bottom remote from said frame; and,
   (b) said bottom of said delimbing arms having rounded corners whereby said arms are prevented from digging into the ground while in use.

6. A vehicle delimbing apparatus for delimbing trees as in claim 1 and wherein:
   (a) said attachment means includes means for attaching to the front scoop of said vehicle.

7. A vehicle delimbing apparatus for delimbing trees as in claim 1 and wherein:
   (a) said attachment means includes means for attaching directly to hydraulic cylinders of said vehicle.

8. A delimbing apparatus for delimbing trees as in claim 4 and wherein:
   (a) said cutting blade is bolted to said delimbing arms.

9. A vehicle delimbing apparatus for delimbing trees as in claim 4 and wherein:
   (a) said delimbing arms include support brackets attached thereto and projecting therefrom; and,
   (b) said cutting blades are attached to said support brackets.

10. A vehicle delimbing apparatus for delimbing trees as in claim 1 and wherein:
    (a) said support braces on the front of said frame project laterally outwardly from said delimbing arms for strengthening the delimbing arms.

11. A vehicle delimbing apparatus for delimbing trees as in claim 1 and wherein:
    (a) said attachment means are pivotally secured to said delimbing apparatus.

12. A vehicle delimbing apparatus for delimbing trees to be attached to a vehicle provided with a movable scoop or the like work performing portion including:
    (a) a frame having a top, a bottom, a front and a back;
    (b) a plurality of delimbing arms projecting from the bottom of said frame;
    (c) support braces secured to the front and back of said frame generally parallel to said delimbing arms extending partially along the length of said arms and being securely affixed to said frame and said arms whereby said delimbing arms are restrained from movement when said delimbing apparatus is operated by being moved along the longitudinal length of felled trees;
    (d) attachment means for attaching said delimbing apparatus to said scoop or the like including a bracket mounted to said frame and extending rearwardly a short distance thereof and including a support arm pivotally connected to said bracket; and,
    (e) said support arm including means for connecting said support arm to said scoop.

* * * * *